(12) United States Patent
Dudar (10) Patent No.: US 11,300,083 B1
(45) Date of Patent: Apr. 12, 2022

(54) METHODS AND SYSTEMS FOR OPERATING A VEHICLE WITH TWO FUEL TANKS

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/204,264

(22) Filed: Mar. 17, 2021

(51) Int. Cl.
| | |
|---|---|
| *F02D 37/00* | (2006.01) |
| *F02M 37/00* | (2006.01) |
| *F02D 41/38* | (2006.01) |
| *F02D 41/06* | (2006.01) |
| *F02D 41/30* | (2006.01) |
| *F02M 21/02* | (2006.01) |
| *F02D 19/06* | (2006.01) |
| *F02D 19/02* | (2006.01) |
| *B60K 15/03* | (2006.01) |

(52) U.S. Cl.
CPC ....... *F02M 37/0088* (2013.01); *F02D 41/061* (2013.01); *F02D 41/3863* (2013.01); *F02M 37/0064* (2013.01); *B60K 2015/03125* (2013.01); *B60K 2015/03138* (2013.01); *F02D 19/029* (2013.01); *F02D 19/0634* (2013.01); *F02D 19/0665* (2013.01); *F02D 41/3082* (2013.01); *F02D 2200/0602* (2013.01); *F02D 2200/0611* (2013.01); *F02M 21/0218* (2013.01)

(58) Field of Classification Search
CPC ....... B60K 2015/03118–03157; F02D 19/029; F02D 19/0634; F02D 19/0665; F02D 41/3082; F02D 41/3863; F02D 2200/0602; F02D 2200/0611; F02M 21/0218; F02M 37/0064; F02M 37/0088
See application file for complete search history.

(56) References Cited

U.S. PATENT DOCUMENTS

| | | | |
|---|---|---|---|
| 5,878,727 | A | 3/1999 | Huls |
| 7,168,415 | B2 * | 1/2007 | Studebaker ........... F02D 33/003 123/509 |
| 7,428,895 | B2 | 9/2008 | Leone et al. |
| 7,802,562 | B2 * | 9/2010 | Lippa ................. F02M 37/0064 123/577 |
| 9,010,305 | B2 | 4/2015 | Leone |
| 9,121,355 | B2 | 9/2015 | Leone |

(Continued)

OTHER PUBLICATIONS

Stolark, "Fact Sheet: The Consumer and Fuel Retailer Choice Act," Sep. 18, 2018. https://www.eesi.org/papers/view/fact-sheet-the-consumer-and-fuel-retailer-choice-act. Accessed Aug. 2, 2021. (Year: 2018).*

(Continued)

*Primary Examiner* — Hung Q Nguyen
*Assistant Examiner* — Mark L. Greene
(74) *Attorney, Agent, or Firm* — Geoffrey Brumbaugh; McCoy Russell LLP (57) ABSTRACT

Systems and methods for operating a fuel system that includes two separate fuel tanks are disclosed. In one example, fuel may be purged from a fuel rail in response to Reid vapor pressure of a fuel so that engine starting may be improved. A fuel with a higher Reid vapor pressure may be pumped into the fuel rail when the engine is expected to be cold started.

19 Claims, 5 Drawing Sheets

(56) References Cited

U.S. PATENT DOCUMENTS

| | | |
|---|---|---|
| 9,273,654 B2 | 3/2016 | Surnilla et al. |
| 9,382,854 B2 | 7/2016 | Leone |
| 9,850,853 B2 | 12/2017 | Dudar et al. |
| 10,163,278 B2 | 12/2018 | Kurtz et al. |
| 10,982,614 B2 | 4/2021 | Fulton et al. |

OTHER PUBLICATIONS

"Plug-In Hybrids and Range-Extended EVS Need to Keep Your Fuel Fresh—Here's How They Do It," Best Ride Website, Available Online at https://bestride.com/news/technology/plug-in-hybrids-and-range-extended-evs-need-to-keep-your-fuel-fresh-heres-how-they-do-it, Jan. 25, 2018, 7 pages.

* cited by examiner

METHODS AND SYSTEMS FOR OPERATING A VEHICLE WITH TWO FUEL TANKS

FIELD

The present description relates to a system and methods for operating a vehicle that includes two fuel tanks. The system and methods may be useful to improve engine starting.

BACKGROUND AND SUMMARY

A vehicle may be equipped with two fuel tanks to extend the vehicle's operating range and to provide an additional source of energy for operating auxiliary loads that may be coupled to the vehicle. The vehicle's operator may selectively choose which tank fuel may be drawn from to supply the vehicle's engine. The vehicle's operator may leave fuel in one of the fuel tanks a longer amount of time than the amount of time that fuel is left in the vehicle's other fuel tank. Consequently, fuel in one of the vehicle's fuel tanks may be older than fuel in the vehicle's other fuel tank. Short chain hydrocarbons may tend to evaporate from the older fuel causing the Reid vapor pressure of the older fuel to be reduced. In addition, greater amounts of water may have condensed in the older fuel. As a result, the engine may not start as well as may be expected if the engine is started with the older fuel. Consequently, engine emissions may increase.

The inventors herein have recognized the above-mentioned disadvantages and have developed a method for operating a fuel system, comprising: in response to an indication of an impending engine start and an estimated Reid vapor pressure of a first fuel exceeding an estimated Reid vapor pressure of a second fuel, flushing the second fuel from a fuel rail to a second fuel tank with the first fuel supplied from a first fuel tank via a controller.

By flushing a fuel having a lower Reid vapor pressure from a fuel rail with a fuel having a high Reid vapor pressure before a cold engine start, it may be possible to improve engine starting and emissions. Specifically, the engine may be started with the fuel with the higher Reid vapor pressure when the engine is cold so that fuel injected into the engine may have a better chance of vaporizing and combusting as compared to if the engine were started with a fuel with a lower Reid vapor pressure. Conversely, if the engine is hot started, a fuel with a higher Reid vapor pressure may be flushed from the fuel rail and replaced by a fuel with a lower Reid vapor pressure so that engine emissions may be maintained at lower levels.

The present description may provide several advantages. In particular, the approach may reduce engine emissions. Further, the approach may improve engine smoothness during cold engine starts. In addition, the approach may help to remove older fuel from a fuel system so that fresher fuel may be available to operate the engine with.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

The present description is related to operating a fuel system for an internal combustion engines. The fuel system includes two fuel tanks for extending the operating range of a vehicle and a run time of an engine. The engine may be of the type shown in FIG. 1, or alternatively, a diesel engine. The fuel system may be configured to exchange fuel between two fuel tanks. The fuel system may be of the type shown in FIG. 2. The fuel system may be operated as shown in the sequence of FIG. 3 according to the method of FIG. 4.

Figure 1:
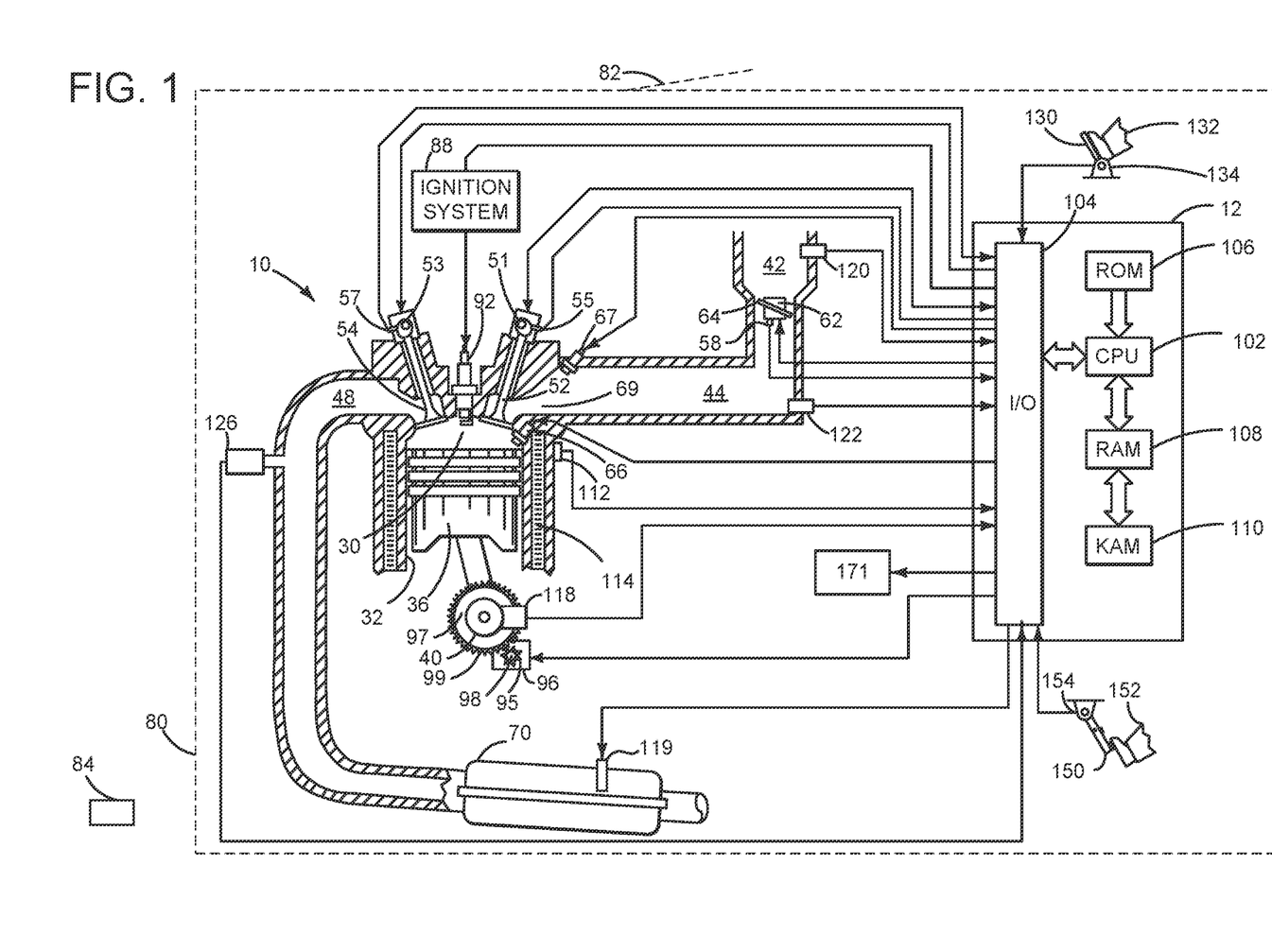
FIG. 1 shows a schematic diagram of an engine in a vehicle.

Referring to FIG. 1, internal combustion engine 10, comprising a plurality of cylinders, one cylinder of which is shown in FIG. 1, is controlled by electronic engine controller 12. Engine 10 is included in vehicle 80, which has one or more doors 82 for ingress and egress. Vehicle 80 may also include a fob, phone, or other remote device 84 that transmits a signal directly or indirectly to vehicle 80 and controller 12 to indicate when a passenger is proximate to vehicle 80.

Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Direct fuel injector 66 is shown positioned to inject fuel directly into cylinder 30, which is known to those skilled in the art as direct injection. Port fuel injector 67, injects fuel to intake port 69, which is known to those skilled in the art as port injection. Fuel injector 66 delivers liquid fuel in proportion to a voltage pulse width or fuel injector pulse width of a signal from controller 12. Likewise, fuel injector 67 delivers liquid fuel in proportion to a voltage pulse width or fuel injector pulse width from controller 12. Fuel is delivered to fuel injectors 66 and 67 by a fuel system (not shown) including a fuel tank, fuel pump, and fuel rail (not shown). Fuel is supplied to direct fuel injector 66 at a higher pressure than fuel is supplied to port fuel injector 67. In addition, intake manifold 44 is shown communicating with optional electronic throttle 62 which adjusts a position of throttle plate 64 to control air flow from air intake 42 to intake manifold 44. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a propulsive effort pedal 130 for sensing force applied by a human foot 132; a position sensor 154 coupled to brake pedal 150 for sensing force applied by a human foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. Further, in some examples, other engine configurations may be employed, for example a diesel engine with multiple fuel injectors. Further, controller 12 may receive input and communicate conditions such as degradation of components to light, or alternatively, human/machine interface 171.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Figure 2:
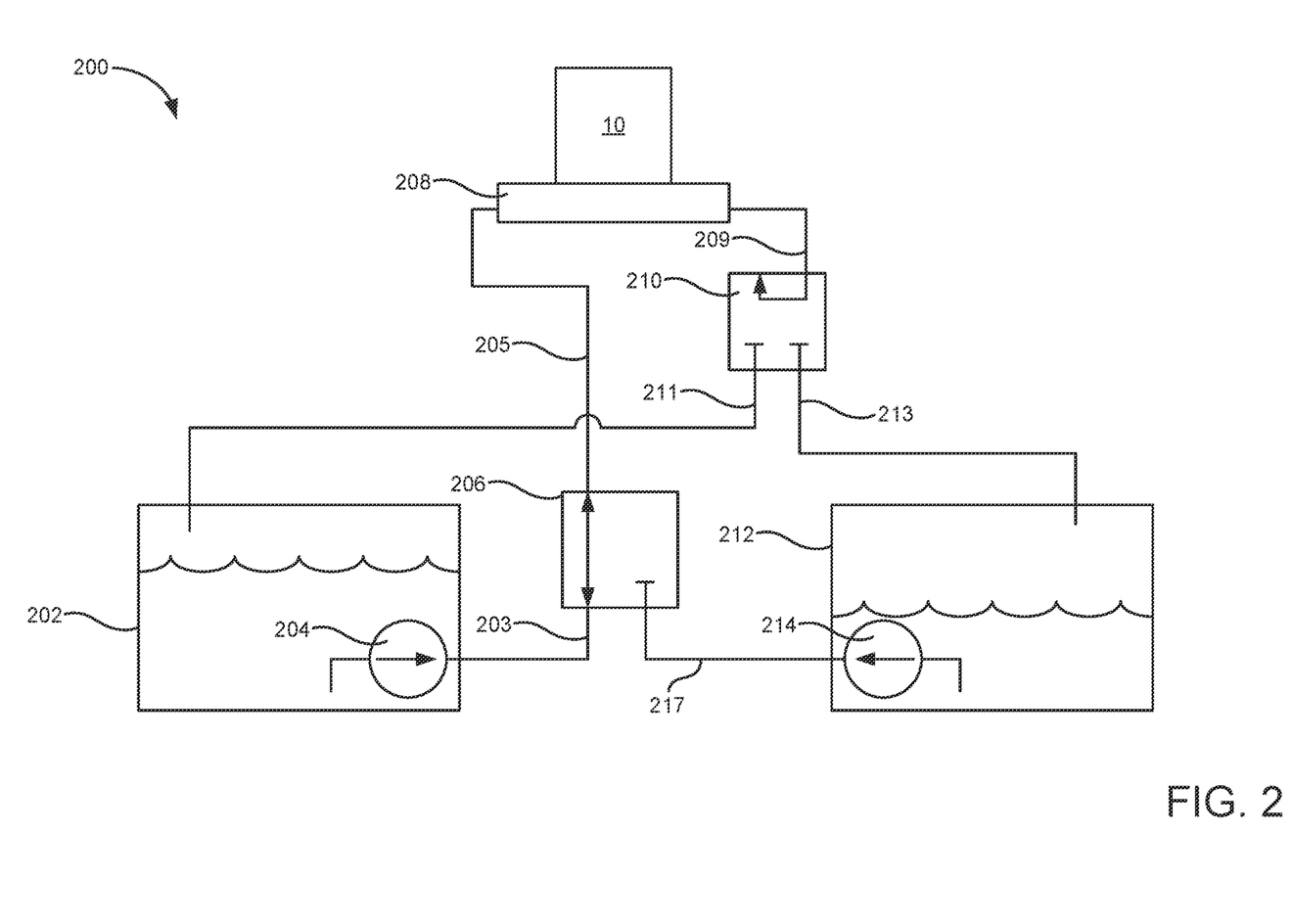
FIG. 2 shows a schematic diagram of a fuel system.
Figure 3:
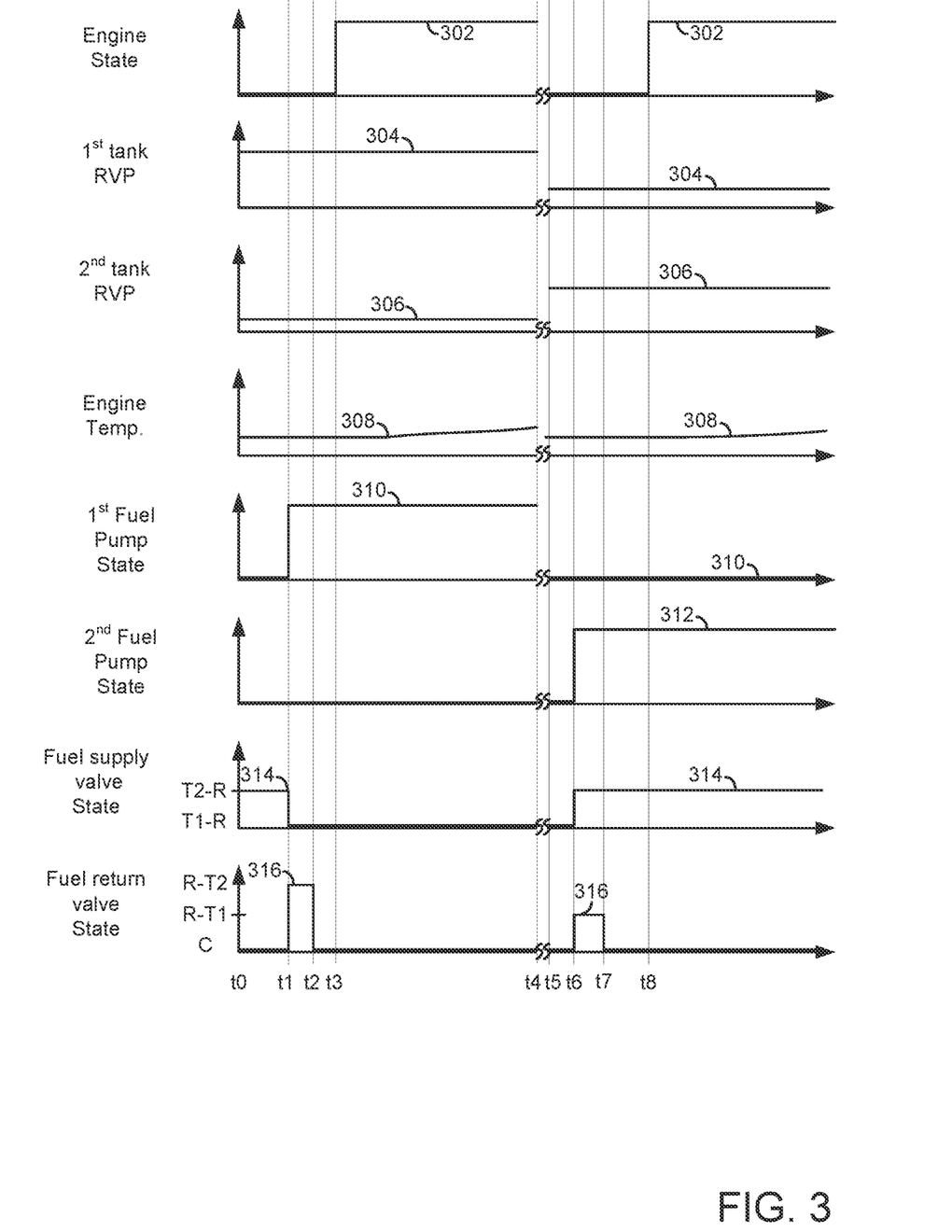
FIG. 3 shows an example engine operating sequence according to the method of FIGS. 4 and 5.

Referring now to FIG. 2, a schematic view of a fuel system 200 for internal combustion engine 10 is shown. Fuel system 200 includes a first fuel tank 202 that includes a first fuel pump. First fuel tank is coupled to three-way fuel supply valve 206 via a conduit or pipe 203. Three-way fuel supply valve 206 is also coupled to fuel rail 208 via conduit or pipe 205. Fuel rail 208 may supply fuel to fuel injectors 66 or 67 as shown in FIG. 1. Fuel rail 208 is coupled to a fuel return valve 210 via conduit or pipe 209. Fuel return valve 210 is coupled to first fuel tank 202 via conduit or pipe 211. Fuel return valve 210 is also coupled to second fuel tank 212 via conduit or pipe 213. Second fuel tank 212 includes a second fuel pump 214. Second fuel pump 212 is coupled to three-way fuel supply valve 206 via conduit or pipe 217.

Three-way fuel supply valve 206 is shown in a default position where fuel is allowed to flow from first fuel pump 204 to fuel rail 208. Three-way fuel supply valve 206 may allow fuel to flow from second fuel pump 214 to fuel rail 208 when three-way fuel supply valve 206 is in a second position.

Fuel return valve 210 is shown in a default position where fuel flow between fuel rail 208 and first fuel tank 202 is not permitted. Fuel flow between fuel rail 208 and second fuel tank 212 is not permitted when fuel return valve 210 is in the default position. Fuel may flow from fuel rail 208 to first fuel tank 202 when fuel return valve 210 is in a second position. Fuel may flow from fuel rail 208 to second fuel tank 212 when fuel return valve 210 is in a third position.

The system of FIGS. 1 and 2 provides for a system, comprising: a first fuel tank; a second fuel tank; a first valve coupled to the first fuel tank and the second fuel tank; a second valve coupled to the first fuel tank and the second fuel tank; an internal combustion engine including a fuel rail; and a controller including executable instructions stored in non-transitory memory that cause the controller to route a first fuel from the first fuel tank through the first valve to the fuel rail and route a second fuel from the fuel rail through the second valve to the second fuel tank in response to an indication of an impending start of the internal combustion engine. The system includes where first fuel has a higher Reid vapor pressure than the second fuel. The system includes where the second fuel has a higher Reid vapor pressure than the first fuel. The system includes where the first valve is a three-way valve, and further comprising a first fuel pump and a second fuel pump and additional instructions to activate the first fuel pump and not activate the second fuel pump in response to the indication of the impending start of the internal combustion engine.

In some examples, the system further comprises additional instructions to estimate a Reid vapor pressure of the first fuel and a Reid vapor pressure of the second fuel. The system further comprises additional instructions to stop fuel flow through the second valve. The system includes where the fuel flow is stopped in response to an indication that the fuel rail is purged of the second fuel. The system further comprises additional instructions to pump the first fuel from the first fuel tank to the second fuel tank in response to the second fuel being in the second fuel tank a longer amount of time than the first fuel has been in the first fuel tank, the second fuel being in the second fuel tank for longer than a threshold amount of time.

Figure 4:
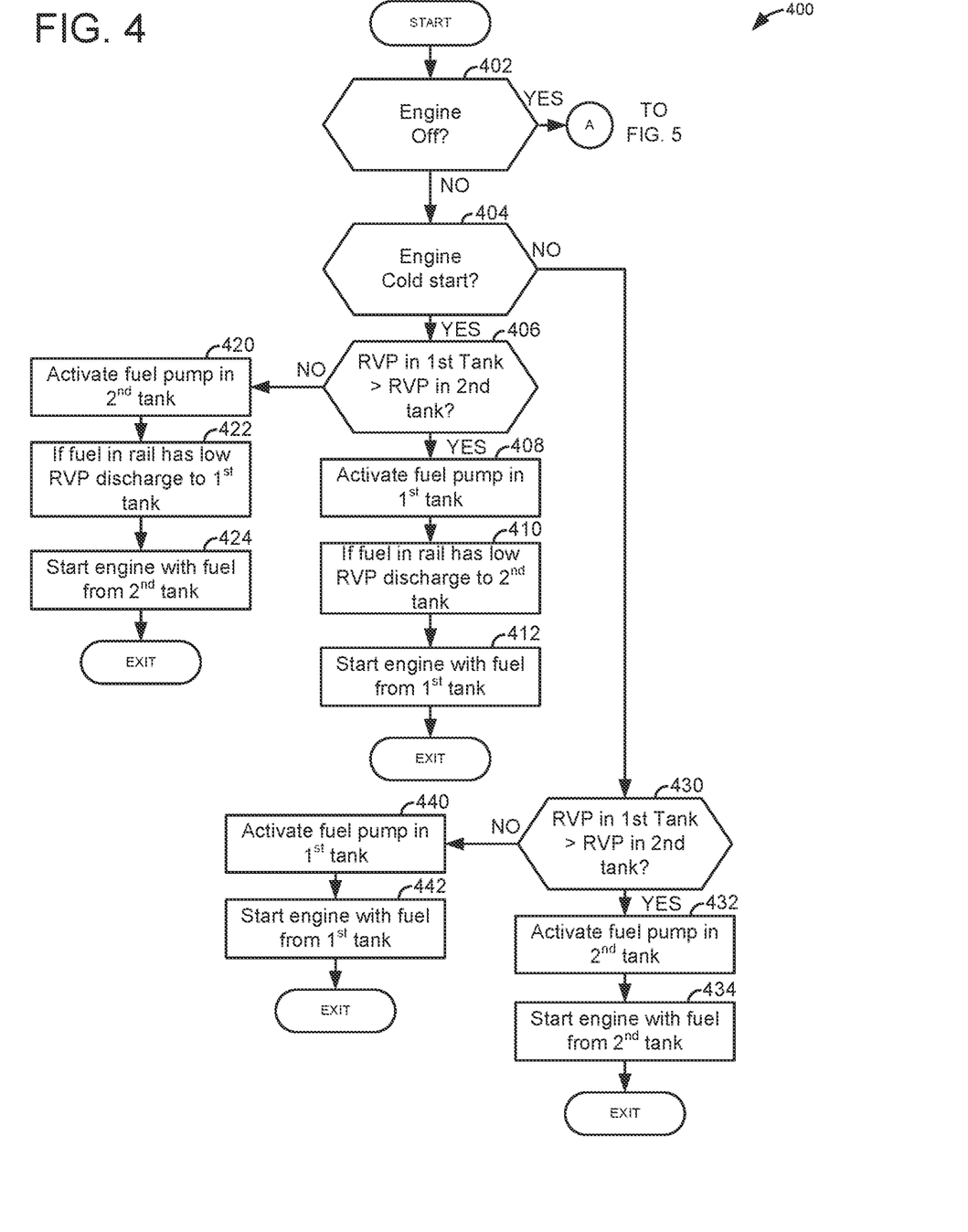
FIGS. 4 and 5 show a method for operating a fuel system of an internal combustion engine.
Figure 5:
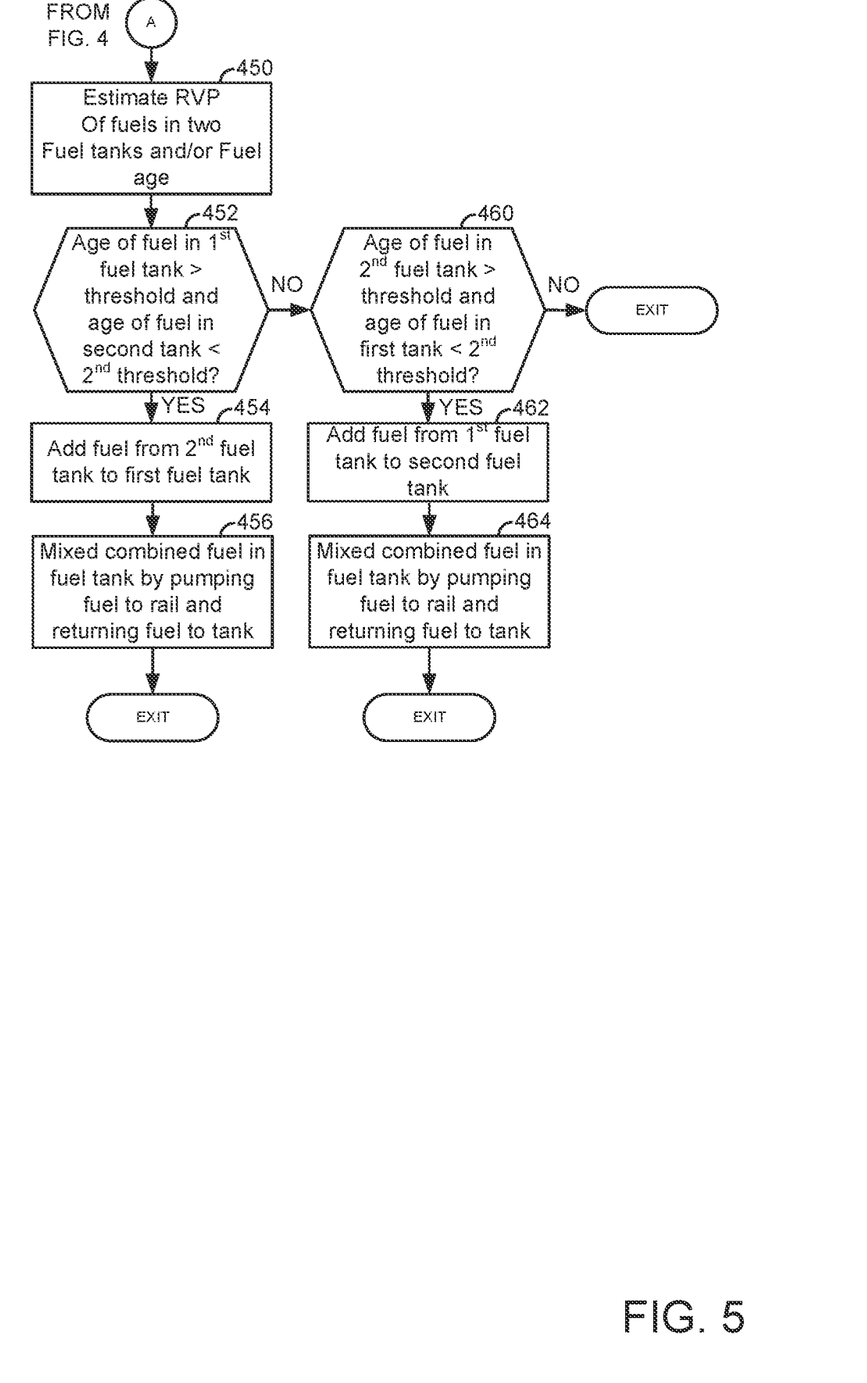

Referring now to FIG. 3, a fuel system operating sequence according to the method of FIGS. 4 and 5 is shown. The sequence of FIG. 3 may be provided via the system of FIGS. 1 and 2 in cooperation with the method of FIGS. 4 and 5. The plots of FIG. 3 are aligned in time. The vertical lines at times t0-t8 represent times if interest in the sequence. The SS marks along the horizontal axes represent a break in time and the break in time may be long or short in duration.

The first plot from the top of FIG. 3 is a plot of engine operating state versus time. The vertical axis represents engine state and the engine state is off and not rotating when trace 302 is at a lower level near the horizontal axis. Trace 302 represents the engine operating state. The engine is on (e.g., combusting fuel) and rotating when trace 302 is at a higher level near the vertical axis arrow. The horizontal axis represents time and time increases from the left side of the figure to the right side of the figure.

The second plot from the top of FIG. 3 is a plot of Reid vapor pressure (RVP) of fuel in the first fuel tank (e.g., tank 202 of FIG. 2) versus time. The vertical axis represents the RVP value for fuel in the first fuel tank and the RVP value increases in the direction of the vertical axis arrow. Trace 304 represents the RVP value for fuel stored in the first fuel tank. The horizontal axis represents time and time increases from the left side of the figure to the right side of the figure.

The third plot from the top of FIG. 3 is a plot of Reid vapor pressure (RVP) of fuel in the second fuel tank (e.g., tank 212 of FIG. 2) versus time. The vertical axis represents the RVP value for fuel in the second fuel tank and the RVP value increases in the direction of the vertical axis arrow. Trace 306 represents the RVP value for fuel stored in the second fuel tank. The horizontal axis represents time and time increases from the left side of the figure to the right side of the figure.

The fourth plot from the top of FIG. 3 is a plot of engine temperature versus time. The vertical axis represents engine temperature and engine temperature increases in the direction of the vertical axis arrow. Trace 308 represents the engine temperature. The horizontal axis represents time and time increases from the left side of the figure to the right side of the figure.

The fifth plot from the top of FIG. 3 is a plot of an operating state of a first fuel pump versus time. The vertical axis represents the operating state of the first fuel pump and the first fuel pump is activated and pumping fuel when trace 310 is at a level that is near the vertical axis arrow. The first fuel pump is not activated and not pumping fuel when trace 310 is at a level that is near the horizontal axis. Trace 310 represents the first fuel pump operating state. The horizontal axis represents time and time increases from the left side of the figure to the right side of the figure.

The sixth plot from the top of FIG. 3 is a plot of an operating state of a second fuel pump versus time. The vertical axis represents the operating state of the second fuel pump and the second fuel pump is activated and pumping fuel when trace 312 is at a level that is near the vertical axis arrow. The second fuel pump is not activated and not pumping fuel when trace 312 is at a level that is near the horizontal axis. Trace 312 represents the second fuel pump operating state. The horizontal axis represents time and time increases from the left side of the figure to the right side of the figure.

The seventh plot from the top of FIG. 3 is a plot of an operating state of a fuel supply valve (e.g., 206 of FIG. 2) versus time. The vertical axis represents the operating state of the fuel supply valve and the fuel supply valve allows communication between the second fuel tank (T2) and the fuel rail (R) when trace 314 is near the level of T2-R along the vertical axis. The fuel supply valve prevents communication between the first fuel tank (T1) and the fuel rail (R) when trace 314 is near the level of T2-R along the vertical axis. The fuel supply valve allows communication between the first fuel tank (T1) and the fuel rail (R) when trace 314 is near the level of T1-R along the vertical axis. The fuel supply valve prevents communication between the second fuel tank (T2) and the fuel rail (R) when trace 314 is near the level of T1-R along the vertical axis. Trace 314 represents the fuel supply valve operating state. The horizontal axis represents time and time increases from the left side of the figure to the right side of the figure.

The eighth plot from the top of FIG. 3 is a plot of an operating state of a fuel return valve (e.g., 210 of FIG. 2) versus time. The vertical axis represents the operating state of the fuel return valve and the fuel return valve allows communication between the fuel rail (R) and the second fuel tank (T2) when trace 316 is near the level of R-T2 along the vertical axis. The fuel supply valve prevents communication between the fuel rail (R) and the first fuel tank (T1) when trace 316 is near the level of R-T2 along the vertical axis. The fuel supply valve allows communication between the fuel rail (R) and first fuel tank (T1) when trace 316 is near the level of R-T1 along the vertical axis. The fuel supply valve prevents communication between the fuel rail (R) and the second fuel tank (T2) when trace 316 is near the level of R-T1 along the vertical axis. Trace 316 represents the fuel supply valve operating state. The fuel rail outlet valve is closed and prevents fluidic communication between the fuel rail (R) and the first fuel tank and the second fuel tank when trace 316 is at the level indicated as C. The horizontal axis represents time and time increases from the left side of the figure to the right side of the figure.

At time t0, the engine is stopped and the RVP of fuel in the first fuel tank is at a high level. The RVP of fuel in the second tank is low and the engine temperature is low. The first and second fuel pumps are not activated. The fuel supply valve is positioned to allow fuel to flow from the second fuel tank to the fuel rail. The fuel return valve is closed and it prevents flow of fuel to the first and second fuel tanks. Such conditions may be present when an engine has been off and has "soaked" at ambient temperatures.

At time t1, an indication is provided to give notice that an engine start may be expected to occur shortly. The indication may be a vehicle door that opens or a key fob, phone, or other remote device becomes within a threshold distance of the vehicle. Thus, before an engine start command is issued, an indication may be provided to generate additional time for purging a fuel rail of a lower RVP fuel. The engine remains stopped and the RVP values for fuel in the first tank and fuel in the second fuel tank remain unchanged. The engine temperature remains unchanged and the second fuel pump is not activated. The first fuel pump in the first fuel tank is activated so that the fuel with the lower RVP may be purged from the fuel rail before the engine is started. The fuel supply valve also changes state to allow fuel to flow from the first fuel tank to the fuel rail. The fuel return valve changes state to allow fuel to flow from the fuel rail to the second fuel tank. In this way, fuel with a lower RVP may be purged from a fuel rail before the engine is started. The RVP for fuels that are in the first and second fuel tanks may be determined while the engine is stopped.

At time t2, the fuel return valve is closed so that fuel pressure may build in the fuel rail before the engine is started. The engine remains off and the RVP value for each of the fuels has not changed. The engine temperature is unchanged and the first fuel pump remains activated. The second fuel pump remains deactivated. The fuel supply valve is positioned to allow fuel flow from the first fuel tank to the fuel rail.

At time t3, the engine is started with fuel from the first fuel tank. The RVP of the fuel in the first tank is unchanged and the RVP of the fuel in the second fuel tank is unchanged. The engine temperature begins to increase and the first fuel pump remains activated. The second fuel pump remains deactivated and the fuel supply valve allows fuel to flow from the first fuel tank to the fuel rail. The sequence of FIG. 3 breaks in time at time t4.

The sequence resumes at time t5, where the engine is stopped. The RVP of fuel in the first fuel tank is lower than the RVP of fuel in the second fuel tank. The RVP value of fuel in a fuel tank may change due to adding fuel to the fuel tank or via evaporation of light ends or small chain hydrocarbons. The engine temperature is low and the first and second fuel pumps are deactivated. The fuel supply valve is positioned to permit fuel to flow from the first fuel tank to the fuel rail. The fuel return valve is positioned to a closed position to prevent fuel from flowing to the first fuel tank and the second fuel tank.

At time t6, an indication is provided to give notice that an engine start may be expected to occur shortly. The indication may be a vehicle door that opens or a key fob, phone, or other remote device becomes within a threshold distance of the vehicle. The engine remains stopped and the RVP values for fuel in the first tank and fuel in the second fuel tank remain unchanged. The engine temperature remains unchanged and the first fuel pump is not activated. The second fuel pump in the second fuel tank is activated so that the fuel with the lower RVP may be purged from the fuel rail before the engine is started. The fuel supply valve also changes state to allow fuel to flow from the second fuel tank to the fuel rail. The fuel return valve changes state to allow fuel to flow from the fuel rail to the first fuel tank. In this way, fuel with a lower RVP may be purged from a fuel rail before the engine is started. The RVP for fuels that are in the first and second fuel tanks may be determined while the engine is stopped.

At time t7, the fuel return valve is closed so that fuel pressure may build in the fuel rail before the engine is started. The engine remains off and the RVP value for each of the fuels has not changed. The engine temperature is unchanged and the second fuel pump remains activated. The first fuel pump remains deactivated. The fuel supply valve is positioned to allow fuel flow from the second fuel tank to the fuel rail.

At time t8, the engine is started with fuel from the second fuel tank. The RVP of the fuel in the first tank is unchanged and the RVP of the fuel in the second fuel tank is unchanged. The engine temperature begins to increase and the second fuel pump remains activated. The second fuel pump remains deactivated and the fuel supply valve allows fuel to flow from the second fuel tank to the fuel rail.

In this way, fuel with a lower RVP may be purged from a fuel rail before an engine start so that the engine may be started with a fuel that has a higher RVP to improve cold engine starting. The fuel with the higher RVP may be supplied to the engine and fuel rail whether the fuel with the higher RVP is in the first fuel tank or in the second fuel tank. The fuel with the lower RVP may be returned to the fuel tank that holds the fuel with the lower RVP.

Referring now to FIGS. 4 and 5, a method for operating a fuel system of an internal combustion engine is described. The method of FIGS. 4 and 5 may be incorporated into the system of FIGS. 1 and 2 as executable instructions stored in non-transitory memory. The method of FIGS. 4 and 5 may cause the controller of FIGS. 1 and 2 to receive inputs from one or more sensors described herein and adjust positions or operating states of one or more actuators described herein in the physical world.

At 402, method 400 judges whether or not the engine is off (e.g., not rotating and not combusting fuel). If so, the answer is yes and method 400 proceeds to 450. Otherwise, the answer is no and method 400 proceeds to 404. In one example, method 400 may judge that the engine is off if fuel is not being injected to the engine and engine speed is less than a threshold speed.

At 450, method 400 estimates the RVP of fuel in a first fuel tank and RVP of a second fuel in a second fuel tank. The fuel in the second fuel tank may be of the same type (e.g., gasoline) as fuel in the first fuel tank. In one example, method 400 estimates the RVP of fuels in the first and second fuel tanks as described in U.S. Pat. No. 5,878,727, which is hereby incorporated by reference for all intents and purposes. In another example, method 400 estimates the RVP of fuels stored in the first and second fuel tanks as described in U.S. Pat. No. 9,850,853, which is hereby incorporated by reference for all intents and purposes. Method 400 stores the RVP estimates for fuels stored in the first and second fuel tanks to controller memory (e.g., RAM or ROM).

Additionally, method 400 may track an amount of time fuel has been in the first and second fuel tanks, which may be referred to herein as the fuel's age. In one example, method 400 may record an amount of time between when fuel is added to each fuel tank to determine the amount of time that fuel has been stored in the first and second fuel tanks. For example, if a fuel tank is nearly empty when the fuel tank is refilled at time t1, the amount of time that fuel has been in the fuel tank begins at time t1 and it may end at a present time, for example at time t2. Thus, the age of the fuel in this example is the amount of time between time t2 and time t1. Further, an aggregate age of two mixed fuels may be determined as a function of the respective amounts of the individual fuels and the age of the individual fuels. Method 400 proceeds to 452 after estimating the age of fuel stored in the first fuel tank and age of the fuel stored in the second fuel tank.

At 452, method 400 judges if a fuel has been stored in the first fuel tank longer than threshold amount of time and if fuel has been stored in the second fuel tank for less than a second threshold amount of time. In one example, the threshold amount of time may be based on a type of fuel (e.g., gasoline, diesel, etc.) and other conditions of the fuel (e.g., summer/winter blend). The second threshold amount of time may also be based on the type of fuel and conditions of the fuel. If so, the answer is yes and method 400 proceeds to 454. Otherwise, the answer is no and method 400 proceeds to 460.

At 454, method 400 begins to add fuel from the second fuel tank to the first fuel tank by activating the second fuel pump in the second fuel tank and adjusting the fuel supply valve (e.g., 206 of FIG. 2) such that the second fuel tank is in communication with the fuel rail and the first fuel tank is not in fluidic communication with the fuel rail via the fuel supply valve. Method 400 also adjusts a position of the fuel return valve (e.g., 210 of FIG. 2) so that the fuel rail is in fluidic communication with the first fuel tank via the fuel return valve. Thus, the second fuel pump provides motive force to move fuel from the second fuel tank to the first fuel tank so that the effective age of fuel in the first fuel tank may be reduced, thereby improving combustion properties of fuel stored in the first fuel tank. Method 400 may deactivate the second fuel pump when a requested amount of fuel is moved from the second fuel tank to the first fuel tank. Method 400 proceeds to 456.

At 456, method 400 may mix the two fuels that are now combined in the first fuel tank. In particular, method 400 may activate the fuel pump in the first fuel tank and adjusting the fuel supply valve (e.g., 206 of FIG. 2) such that the first fuel tank is in fluidic communication with the fuel rail and the second fuel tank is not in fluidic communication with the fuel rail via the fuel supply valve. Method 400 may also adjust a position of the fuel return valve (e.g., 210 of FIG. 2) so that the fuel rail is in fluidic communication with the first fuel tank via the fuel return valve. Thus, fuel in the first fuel tank may be pumped up to the fuel rail and returned to the first fuel tank via the fuel return valve to improve mixing of fuel that is in the first fuel tank. Method 400 deactivates the first fuel pump after fuel in the first fuel tank is mixed for a predetermined amount of time. Method 400 proceeds to exit.

At 460, method 400 judges if a fuel has been stored in the second fuel tank longer than threshold amount of time and if fuel has been stored in the first fuel tank for less than a second threshold amount of time. In one example, the threshold amount of time may be based on a type of fuel (e.g., gasoline, diesel, etc.) and other conditions of the fuel (e.g., summer/winter blend). The second threshold amount of time may also be based on the type of fuel and conditions of the fuel. If so, the answer is yes and method 400 proceeds to 462. Otherwise, the answer is no and method 400 proceeds to exit.

At 462, method 400 begins to add fuel from the first fuel tank to the second fuel tank by activating the first fuel pump in the first fuel tank and adjusting the fuel supply valve (e.g., 206 of FIG. 2) such that the first fuel tank is in fluidic communication with the fuel rail and the second fuel tank is not in fluidic communication with the fuel rail via the fuel supply valve. Method 400 also adjusts a position of the fuel return valve (e.g., 210 of FIG. 2) so that the fuel rail is in fluidic communication with the second fuel tank via the fuel return valve. Thus, the first fuel pump provides motive force to move fuel from the first fuel tank to the second fuel tank so that the effective age of fuel in the second fuel tank may be reduced, thereby improving combustion properties of fuel stored in the second fuel tank. Method 400 may deactivate the first fuel pump when a requested amount of fuel is moved from the first fuel tank to the second fuel tank. Method 400 proceeds to 464.

At 464, method 400 may mix the two fuels that are now combined in the second fuel tank. In particular, method 400 may activate the fuel pump in the second fuel tank and adjust the fuel supply valve (e.g., 206 of FIG. 2) such that the second fuel tank is in communication with the fuel rail and the first fuel tank is not coupled to the fuel rail via the fuel supply valve. Method 400 may also adjust a position of the fuel return valve (e.g., 210 of FIG. 2) so that the fuel rail is in fluidic communication with the second fuel tank via the fuel return valve. Thus, fuel in the second fuel tank may be pumped up to the fuel rail and returned to the second fuel tank via the fuel return valve to improve mixing of fuel that is in the second fuel tank. Method 400 deactivates the second fuel pump after fuel in the second fuel tank is mixed for a predetermined amount of time. Method 400 proceeds to exit.

At 404, method 400 judges whether or not the engine is being cold started. If so, the answer is yes and method 400 proceeds to 406. Otherwise, the answer is no and method 400 proceeds to 430. In one example, method 400 may judge that the engine is being cold started if engine temperature is less than a first threshold temperature and/or if an exhaust catalyst temperature is less than a second threshold temperature.

At 430, method 400 judges if the RVP of fuel stored in the first fuel tank is greater than the RVP of fuel stored in the second fuel tank. Method 400 may retrieve the RVP values for the respective fuels from controller memory. The RVP values may be determined while the engine is off as described at 450. If method 400 judges that the RVP of fuel stored in the first fuel tank is greater than the RVP of fuel stored in the second fuel tank, the answer is yes and method 400 proceeds to 432. Otherwise, the answer is no and method 400 proceeds to 440.

At 432, method 400 activates the second fuel pump in the second fuel tank. Method 400 may also adjust a position of a fuel supply valve such that the second fuel tank is in fluid communication with the fuel rail via the fuel supply valve. The first fuel tank is not in fluid communication with the fuel rail via the fuel supply valve. Method 400 may also adjust a position of the fuel return valve such that the fuel rail is in fluidic communication with the second fuel tank for a predetermined amount of time before the engine is started. Method 400 may close the fuel return valve after the predetermined amount of time. Method 400 proceeds to 434.

At 434, method 400 starts the engine via cranking the engine via a starter and injecting fuel from the second fuel tank into the engine. Method 400 proceeds to exit after the engine is started.

At 440, method 400 activates the first fuel pump in the first fuel tank. Method 400 may also adjust a position of a fuel supply valve such that the first fuel tank is in fluidic communication with the fuel rail via the fuel supply valve. The second fuel tank is not in fluidic communication with the fuel rail via the fuel supply valve. Method 400 may also adjust a position of the fuel return valve such that the fuel rail is in fluidic communication with the first fuel tank for a predetermined amount of time before the engine is started. Method 400 may close the fuel return valve after the predetermined amount of time. Method 400 proceeds to 442.

At 442, method 400 starts the engine via cranking the engine via a starter and injecting fuel from the first fuel tank into the engine. Method 400 proceeds to exit after the engine is started.

At 406, method 400 judges if the RVP of fuel stored in the first fuel tank is greater than the RVP of fuel stored in the second fuel tank. Method 400 may retrieve the RVP values for the respective fuels from controller memory. The RVP values may be determined while the engine is off as described at 450. If method 400 judges that the RVP of fuel stored in the first fuel tank is greater than the RVP of fuel stored in the second fuel tank, the answer is yes and method 400 proceeds to 408. Otherwise, the answer is no and method 400 proceeds to 420.

At 408, method 400 activates the first fuel pump in the first fuel tank. Method 400 may also adjust a position of a fuel supply valve such that the first fuel tank is in fluidic communication with the fuel rail via the fuel supply valve. The second fuel tank is not in fluidic communication with the fuel rail via the fuel supply valve. Method 400 proceeds to 410.

At 410, method 400 may also adjust a position of the fuel return valve such that the fuel rail is in fluidic communication with the second fuel tank for a predetermined amount of time before the engine is started. Method 400 may close the fuel return valve after the predetermined amount of time. By allowing fluidic communication between the fuel rail and the second fuel tank via the fuel return valve, fuel in the fuel rail with a lower RVP may be discharged to the fuel tank with the fuel having the lower RVP. Method 400 may adjust the position of the fuel line return valve based on the RVP of fuel that is in the fuel rail. Method 400 may determine the RVP of fuel in the fuel rail by storing to memory the fuel that was being injected to the engine when the engine was stopped. Thus, if fuel from the first fuel tank was being injected to the engine when the engine was being stopped and fuel in the first fuel tank has a higher RVP than fuel in the second fuel tank, then method 400 may keep the fuel return valve closed. However, if fuel from the second fuel tank was being injected to the engine when the engine was being stopped and fuel in the first fuel tank has a higher RVP than fuel in the second fuel tank, then method 400 may adjust the position of the fuel return valve to direct fuel from the fuel rail to the second fuel tank. Method 400 proceeds to 412.

At 412, method 400 starts the engine via cranking the engine via a starter and injecting fuel from the first fuel tank into the engine. Method 400 proceeds to exit after the engine is started.

At 420, method 400 activates the second fuel pump in the second fuel tank. Method 400 may also adjust a position of a fuel supply valve such that the second fuel tank is in fluidic communication with the fuel rail via the fuel supply valve. The first fuel tank is not in fluidic communication with the fuel rail via the fuel supply valve. Method 400 proceeds to 422.

At 422, method 400 may also adjust a position of the fuel return valve such that the fuel rail is in communication with the first fuel tank for a predetermined amount of time before the engine is started. Method 400 may close the fuel return valve after the predetermined amount of time. By allowing fluidic communication between the fuel rail and the first fuel tank via the fuel return valve, fuel in the fuel rail with a lower RVP may be discharged to the fuel tank with the fuel having the lower RVP. Method 400 may adjust the position of the fuel line return valve based on the RVP of fuel that is in the fuel rail. Method 400 may determine the RVP of fuel in the fuel rail by storing to memory the fuel that was being injected to the engine when the engine was stopped. Thus, if fuel from the second fuel tank was being injected to the engine when the engine was being stopped and fuel in the second fuel tank has a higher RVP than fuel in the first fuel tank, then method 400 may keep the fuel return valve closed. However, if fuel from the first fuel tank was being injected to the engine when the engine was being stopped and fuel in the second fuel tank has a higher RVP than fuel in the first fuel tank, then method 400 may adjust the position of the fuel return valve to direct fuel from the fuel rail to the first fuel tank. Method 400 proceeds to 424.

At 424, method 400 starts the engine via cranking the engine via a starter and injecting fuel from the second fuel tank into the engine. Method 400 proceeds to exit after the engine is started.

In this way, operation of a fuel system may be adjusted to improve engine starting. In particular, during cold engine starts, a fuel with a higher RVP may be supplied to the engine to improve engine starting. However, if the engine is started warm, a fuel with a lower RVP may be supplied to the engine so that fuel vaporization within the engine may be within an expected range.

Thus, method 400 provides for operating a fuel system, comprising: in response to an indication of an impending engine start and an estimated Reid vapor pressure of a first fuel exceeding an estimated Reid vapor pressure of a second fuel, flushing the second fuel from a fuel rail to a second fuel tank with the first fuel supplied from a first fuel tank via a controller. The method further comprises estimating the Reid vapor pressure of the first fuel and the second fuel when an engine that includes the fuel system is stopped. The method includes where the impending engine start is a cold engine start. The method includes where flushing the second fuel includes activating a first fuel pump that supplies the first fuel from the first fuel tank to the fuel rail. The method includes where the indication of the impending engine start is an open vehicle door. The method includes where the indication of the impending engine start is a fob being within a threshold distance of a vehicle. The method further comprises pumping the first fuel from the first fuel tank to the second fuel tank in response to the second fuel being in the second fuel tank a longer amount of time than the first fuel has been in the first fuel tank, the second fuel being in the second fuel tank for longer than a threshold amount of time.

Method 400 also provides for operating a fuel system, comprising: in response to a Reid vapor pressure, flushing a second fuel from a fuel rail to a second fuel tank with a first fuel supplied from a first fuel tank via a controller; and pumping the first fuel from the first fuel tank to the second fuel tank in response to a length of time the second fuel has been in the second fuel tank. The method further comprises mixing the first fuel with the second fuel via activating a second pump in the second fuel tank and opening a fuel return valve. The method includes where the first fuel is pumped to the second fuel tank while an engine that the fuel system is coupled to is stopped. The method includes where pumping the first fuel tank to the second fuel tank includes pumping the first fuel through a fuel rail. The method includes where the flushing occurs after an engine stop and before an engine start.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating a fuel system, comprising:
in response to an indication of an impending engine start and an estimated Reid vapor pressure of a first fuel exceeding an estimated Reid vapor pressure of a second fuel, flushing the second fuel from a fuel rail to a second fuel tank with the first fuel supplied from a first fuel tank via a controller.

2. The method of claim 1, further comprising estimating the Reid vapor pressure of the first fuel and the second fuel when an engine that is coupled to the fuel system is stopped.

3. The method of claim 1, where the impending engine start is a cold engine start.

4. The method of claim 1, where flushing the second fuel includes activating a first fuel pump that supplies the first fuel from the first fuel tank to the fuel rail.

5. The method of claim 1, where the indication of the impending engine start is an open vehicle door.

6. The method of claim 1, where the indication of the impending engine start is a fob being within a threshold distance of a vehicle.

7. The method of claim 1, further comprising pumping the first fuel from the first fuel tank to the second fuel tank in response to the second fuel being in the second fuel tank a longer amount of time than the first fuel has been in the first fuel tank, the second fuel being in the second fuel tank for longer than a threshold amount of time.

8. A system, comprising:
a first fuel tank;
a second fuel tank;
a first valve coupled to the first fuel tank and the second fuel tank;
a second valve coupled to the first fuel tank and the second fuel tank;
an internal combustion engine including a fuel rail; and
a controller including executable instructions stored in non-transitory memory that cause the controller to route a first fuel from the first fuel tank through the first valve to the fuel rail and route a second fuel from the fuel rail through the second valve to the second fuel tank in response to an indication of an impending start of the internal combustion engine, and additional instructions to estimate a Reid vapor pressure of the first fuel and a Reid vapor pressure of the second fuel.

9. The system of claim 8, where the first fuel has a higher Reid vapor pressure than the second fuel.

10. The system of claim 8, where the second fuel has a higher Reid vapor pressure than the first fuel.

11. The system of claim 8, where the first valve is a three-way valve, and further comprising a first fuel pump and a second fuel pump and additional instructions to activate the first fuel pump and not activate the second fuel pump in response to the indication of the impending start of the internal combustion engine.

12. The system of claim 8, further comprising additional instructions to stop fuel flow through the second valve.

13. The system of claim 12, where the fuel flow is stopped in response to an indication that the fuel rail is purged of the second fuel.

14. The system of claim 12, further comprising additional instructions to pump the first fuel from the first fuel tank to the second fuel tank in response to the second fuel being in the second fuel tank a longer amount of time than the first fuel has been in the first fuel tank, the second fuel being in the second fuel tank for longer than a threshold amount of time.

15. A method for operating a fuel system, comprising:
in response to a Reid vapor pressure, flushing a second fuel from a fuel rail to a second fuel tank with a first fuel supplied from a first fuel tank via a controller; and
pumping the first fuel from the first fuel tank to the second fuel tank in response to a length of time the second fuel has been in the second fuel tank.

16. The method of claim 15, further comprising mixing the first fuel with the second fuel via activating a second pump in the second fuel tank and opening a fuel return valve.

17. The method of claim 15, where the first fuel is pumped to the second fuel tank while an engine that the fuel system is coupled to is stopped.

18. The method of claim 15, where pumping the first fuel from the first fuel tank to the second fuel tank includes pumping the first fuel through a fuel rail.

19. The method of claim 15, where the flushing occurs after an engine stop and before an engine start.

* * * * *